(12) United States Patent
Lin et al.

(10) Patent No.: US 11,935,462 B2
(45) Date of Patent: Mar. 19, 2024

(54) ELECTRONIC DEVICE WITH DYNAMIC REFRESH SIGNAL

(71) Applicant: SENSORTEK TECHNOLOGY CORP., Zhubei (TW)

(72) Inventors: Yen-Chung Lin, Zhubei (TW); Rong-Fong Chen, Zhubei (TW)

(73) Assignee: Sensortek Technology Corp., Zhubei (TW)

( * ) Notice: Subject to any disclaimer, the term of this patent is extended or adjusted under 35 U.S.C. 154(b) by 0 days.

(21) Appl. No.: 18/084,223

(22) Filed: Dec. 19, 2022

(65) Prior Publication Data

US 2023/0252936 A1   Aug. 10, 2023

Related U.S. Application Data

(60) Provisional application No. 63/265,596, filed on Dec. 17, 2021.

(51) Int. Cl.
*G09G 3/32* (2016.01)
*G09G 3/20* (2006.01)

(52) U.S. Cl.
CPC .............. *G09G 3/32* (2013.01); *G09G 3/2092* (2013.01); *G09G 2310/08* (2013.01); *G09G 2320/0242* (2013.01); *G09G 2320/0247* (2013.01); *G09G 2340/0435* (2013.01); *G09G 2360/14* (2013.01)

(58) Field of Classification Search
CPC ........................................................ G09G 3/32
See application file for complete search history.

(56) References Cited

U.S. PATENT DOCUMENTS

| 2015/0339994 | A1* | 11/2015 | Verbeure | G09G 3/3614 |
| | | | | 345/214 |
| 2020/0117782 | A1 | 4/2020 | Lee et al. | |
| 2020/0410942 | A1 | 12/2020 | Kim | |

FOREIGN PATENT DOCUMENTS

| TW | 202042205 A | 11/2020 |
| TW | 202123199 A | 6/2021 |

OTHER PUBLICATIONS

International Official Action Issued By Foreign Patent Office in Application No. 111148809 (First Document).
International Official Action Issued By Foreign Patent Office in Application No. 111148809 (Second Document).

* cited by examiner

*Primary Examiner* — Gustavo Polo
(74) *Attorney, Agent, or Firm* — Rosenberg, Klein & Lee (57) ABSTRACT

The present application relates to an electronic device comprising: a display unit, a display driver circuit and a circuit element. The display driver circuit is coupled to the display unit. The circuit element is placed under a display area of the display unit. The circuit element receives a dynamic refresh signal generated by the display driver circuit. The dynamic refresh signal contains a refresh rate information of the display unit. Thereby, the problem that the interference between the display pixels and the circuit element under the display unit cannot be avoided when the refresh rate changes is solved.

7 Claims, 7 Drawing Sheets

ELECTRONIC DEVICE WITH DYNAMIC REFRESH SIGNAL

FIELD OF THE INVENTION

The present application relates an electronic device, in particular to an electronic device with circuit elements disposed under a display screen.

BACKGROUND OF THE INVENTION

Modern consumer electronic products, for example, smartphones or tablet computers, are being developed in the trend of maximum display screen size by various venders. They attempt to relocate the circuit components originally disposed in the frame of the screen to under the display region, thus eliminating the area previously occupied by circuit components in the frame, in order to further reduce the size of the frame. Consequently, under a fixed size, electronic products may have a larger display region and achieve a superior screen-to-body ratio. Currently, the circuit elements that may be moved under the display screen include optical lenses, fingerprint sensors, and various optical sensors, etc.

Nonetheless, the display pixels and the circuit elements disposed under the display will influence each other. For example, the lens under a display might receive the light emitted from the display pixels and distort the images. On the other hand, when a circuit element with a light emitter, such as a proximity sensor, a time-of-flight sensor, or a dot projector, is placed under a display, the invisible emitted light still may influence images on the display and possibly lead to light spots. Various technical solutions are proposed by different suppliers to solve the interference problem between the display pixels and the circuit elements under the display. For example, the circuit elements under the display are controlled to be inactive when the display pixels are emitting light; or the display pixels are controlled to be inactive when the circuit elements are active.

With the development trend of display technologies toward high resolution, high refresh rate, and improved operation and communication performance, the power consumption of electronic devices will increase correspondingly. Given a limited battery capacity, some suppliers proposed dynamically adjusting the refresh rate for lowering the overall power consumption. For example, the refresh rate of a display may be controlled to be above 90 Hz in the game or video mode, 60 Hz~80 Hz in a normal mode, and 10 Hz~30 Hz for a still image.

Unfortunately, changes in the refresh rate of the display make it difficult for electronic devices to accurately locate when the display pixels relative to their under-display circuit components should emit light. Thereby, many existing methods of avoiding interference between the display pixels and the circuit elements under the display are no longer useful. Improvements are apparently required.

SUMMARY OF THE INVENTION

An objective of the present application is to provide an electronic device. The circuit element under the display receives a dynamic refresh signal generated by a display driving circuit. The dynamic refresh signal includes the refresh rate information of the display panel. Thereby, by driving the circuit element according to the current refresh rate, the interference between the display pixels and the circuit element may be avoided and hence solving the failure problem due to refresh rate variation according to the prior art.

The present application discloses an electronic device, which comprises a display unit, a display driving circuit, and a circuit element. The display driving circuit is coupled to the display unit. The circuit element is disposed under a display region of the display unit and coupled to the display driving circuit for receiving a dynamic refresh signal generated by the display driving circuit. The dynamic refresh signal comprises the refresh rate information of the display unit.

DETAILED DESCRIPTION OF THE INVENTION

In order to make the structure and characteristics as well as the effectiveness of the present application to be further understood and recognized, the detailed description of the present application is provided as follows along with embodiments and accompanying figures.

In the specifications and subsequent claims, certain trems are used to represent specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the terms "comprising", "including" are open language and should be explained as "comprising but not limited to". Besides, the term "couple" includes any direct and indirect electrical connection. Thereby, if the description is that a first device is coupled to a second device, it means that the first device is connected electrically to the second device directly, or the first device is connected electrically to the second device via other device or connecting means indirectly, such that signal transmission between the first device and the second device is enabled.

In the following, various embodiments will be further used to illustrate the properties and structures of the electronic device and the circuit elements thereof according to the present application.

Figure 1:
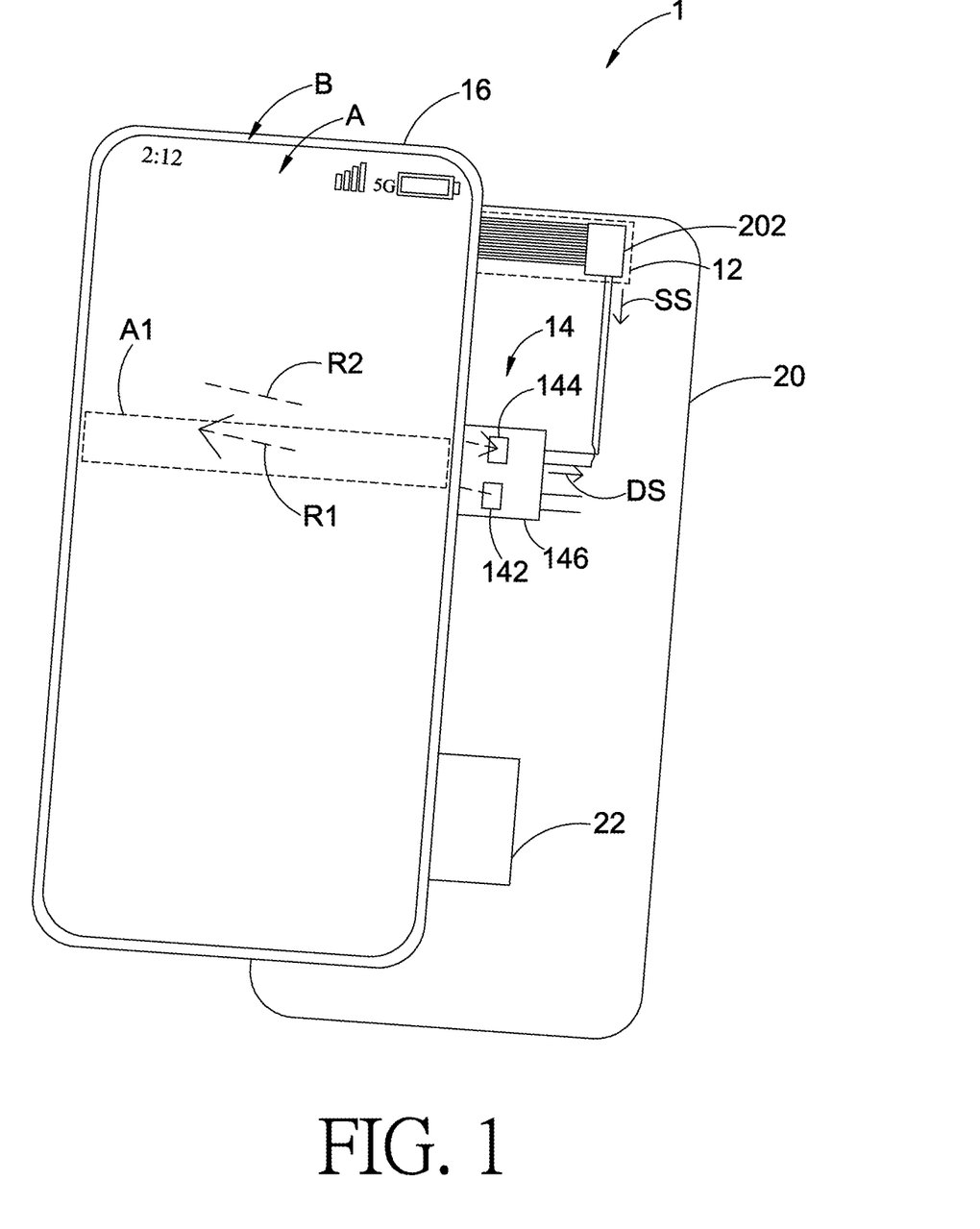
FIG. 1 shows a schematic diagram of the electronic device according to an embodiment of the present application.

First, please refer to FIG. 1, which shows a schematic diagram of the electronic device according to an embodiment of the present application. As shown in the figure, an electronic device 1 according to the present application comprises a display driving circuit 12, a circuit element 14, and a display unit 16. According to the present embodiment, the circuit element 14 includes a light-emitting unit 142, a sensing unit 144, and a control circuit 146. The control circuit 146 is coupled to the light-emitting unit 142 and the sensing unit 144, respectively. The display unit 16 may be a display panel such as a liquid-crystal display (LCD) or an organic light-emitting diode (OLED) display. Besides, the display unit 16 may integrate with a touch circuit for providing touch functions. The light-emitting unit 142 and the sensing unit 144 of the circuit element 14 are disposed under a display region A of the display unit 16. Thereby, the circuit element 14 according to the present embodiment is a under-the-display design. The light-emitting unit 142 and the sensing unit 144 according to the present embodiment may be integrated with the control circuit 146 to form an integrated-circuit chip. Nonetheless, the present application is not limited to the embodiment. The light-emitting unit 142 and the sensing unit 144 may be further disposed at different locations under the display region A and coupled to the control circuit 146, respectively. The so-called display region A means the region on the display unit 16 with effective display pixels for displaying images and not covered by a frame region B of the electronic device.

According to the present embodiment, the circuit element 14 including the light-emitting unit 142, the sensing unit 144, and the control circuit 146 is adopted as an example, the circuit elements 14 may be set as various sensing devices, such as a proximity sensor, a time-of-flight sensor, or a dot projector. However, the reason for using these circuit element 14 for illustration is that the included light-emitting unit 142 may affect the display imaging, making it crucial to avoid mutual interference between the display pixels of the display unit 16 and the light-emitting unit 142. In contrast, optical lenses, fingerprint sensors, and ambient light sensors are circuit elements influenced by the light emitted from displays only. Thereby, using the circuit element 14 may illustrate the improvements given by the present application more easily and completely.

The circuit element 14 according to the present embodiment is further coupled to the display driving circuit 12. The display driving circuit 12 is coupled to the display unit 16. To elaborate further, the display driving circuit 12 may be coupled to the control circuit 146 of the circuit element 14 via a transmission unit 202. The transmission unit 202 may be a cable or other electrical connection means. The transmission unit 202 and the circuit element 14 may be disposed on a substrate 20. The substrate 20 may be, but not limited to, the mainboard of an electronic product such as a smartphone. The display driving circuit 12 is generally formed by a single or multiple independent integrated-circuit chips responsible for controlling the driving timing, driving voltage, and display data access of the display unit 16 to drive the display unit 16 correctly and display images.

Figure 2:
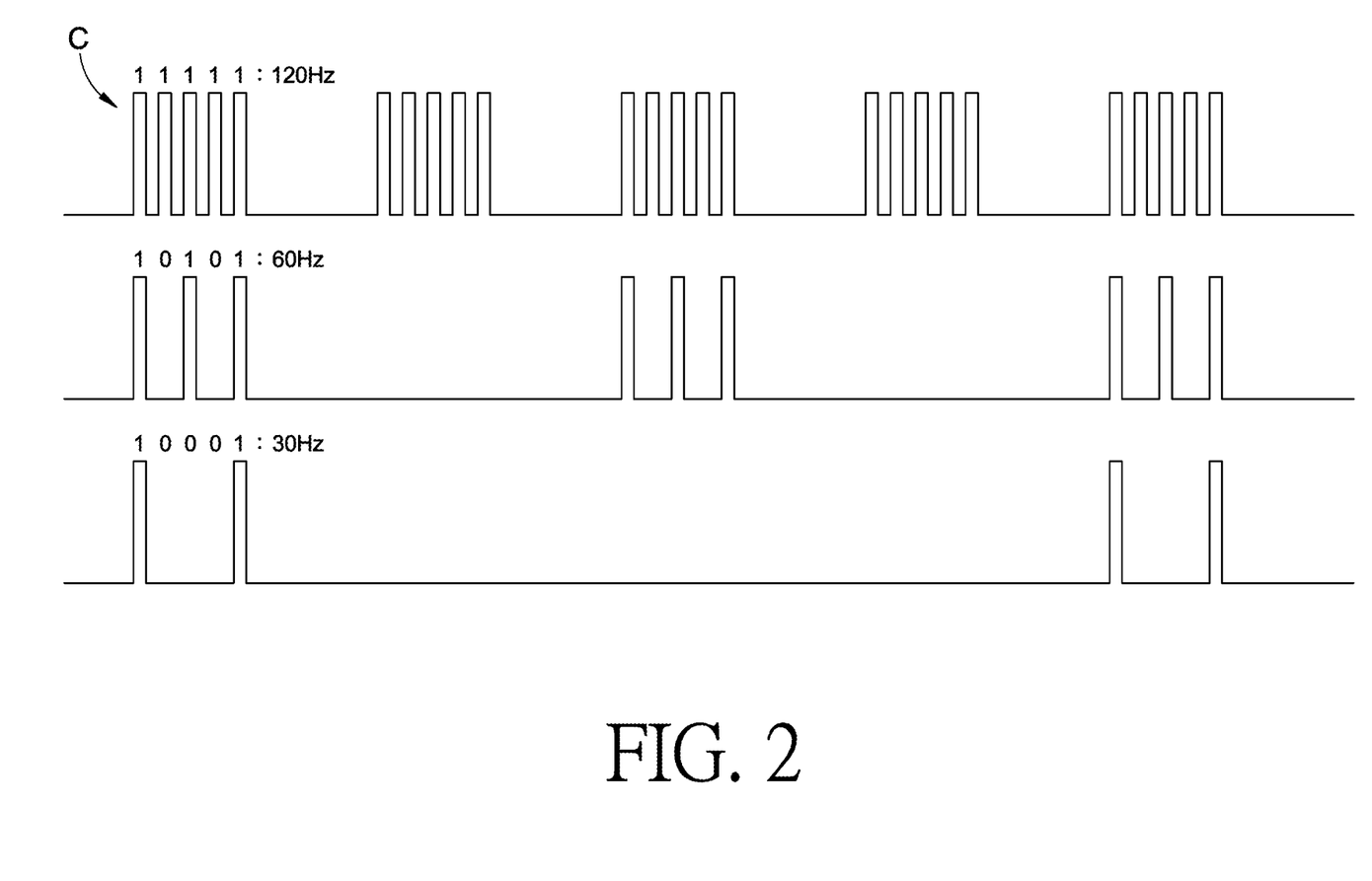
FIG. 2 shows a schematic diagram of the dynamic refresh signal of the electronic device according to the first embodiment of the present application.

The display driving circuit 12 will generate a dynamic refresh signal SS, which includes the refresh rate information of the display unit 16. In addition, according to the present embodiment, the display driving circuit 12 outputs the dynamic refresh signal SS to the control circuit 146 of the circuit element 14. For example, FIG. 2 shows an embodiment of the dynamic refresh signal SS, which includes the instruction C formed by multiple pulse waves. As shown in the figure, five pulse waves are used in the example. If the first and the last pulse wave represent the start and end signals of the instruction C, respectively, the three pulse waves therebetween may store at least three bits bit[2:0] of refresh rate information. Namely, there are at most eight types of refresh rate information. For example, "000" may be represented to 30 Hz; "010" may be represented to 60 Hz; and "111" may be represented to 120 Hz.

After the circuit element 14 receives the dynamic refresh signal SS, all it needs to do is to decode the instruction C to immediately confirm the current refresh rate of the display unit 16. Thereby, the operation of the circuit element 14 may coordinate with the display driving circuit 12. Please refer to FIG. 3, which shows a timing diagram of using the dynamic refresh signal SS by the circuit element 14 according to an embodiment of the present application. Since the location of the circuit element 14 in the electronic device 1 is fixed, when the light-emitting unit 142 is disposed under the display unit 16, a sensing ray R1 emitted by the light-emitting unit 142 will influence only a row or several rows of display pixels in a partial display region A1. Thereby, once the light-emitting unit 142 is controlled to activate at a specific time, the light-emitting time of the display pixels in the partial display region A1 may be avoided. Then light spots or flickers interfered by the light-emitting unit 142 on the display unit 16 may be prevented. For example, to control the light-emitting unit 142 not to activate until 200 scan lines beyond the partial display region A1 is enabled, the figure labels the line time in the partial display region A1 in the dynamic refresh signal SS. In the normal condition, use this location as the baseline and calculate the time required for 200 scan lines beyond to be enabled. Then the light-emitting unit 142 may be controlled to activate at the proper moment.

Figure 3:
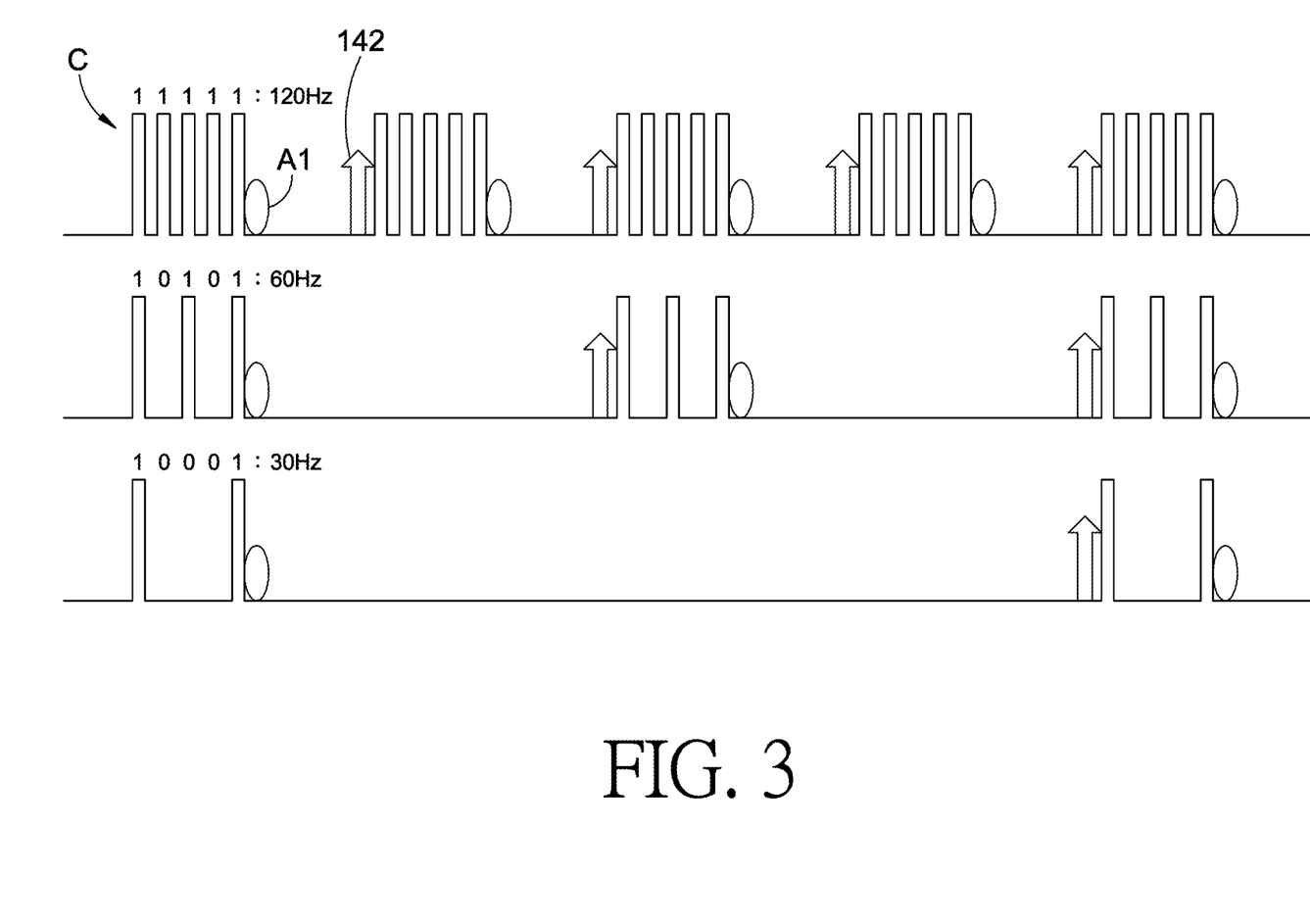
FIG. 3 shows a timing diagram of using the dynamic refresh signal by the circuit element according to an embodiment of the present application.

Nonetheless, as reported by the prior art, when the refresh rate of the display unit 16 may be adjusted dynamically, as shown in FIG. 3, the time for the light-emitting unit 142 to activate in different refresh rates of the display unit 16 should be different, leading to failure of the solution to avoid interference between the display pixels and the circuit element under the display. In contrast, according to the embodiment of the present application, because the circuit element 14 may confirm the current refresh rate of the display unit 16 by simply decoding the instruction C, no matter how the current refresh rate of the display unit 16 changes, the control circuit 146 of the circuit element 14 still may calculate the correct activation time of the light-emitting unit 142.

Figure 4:
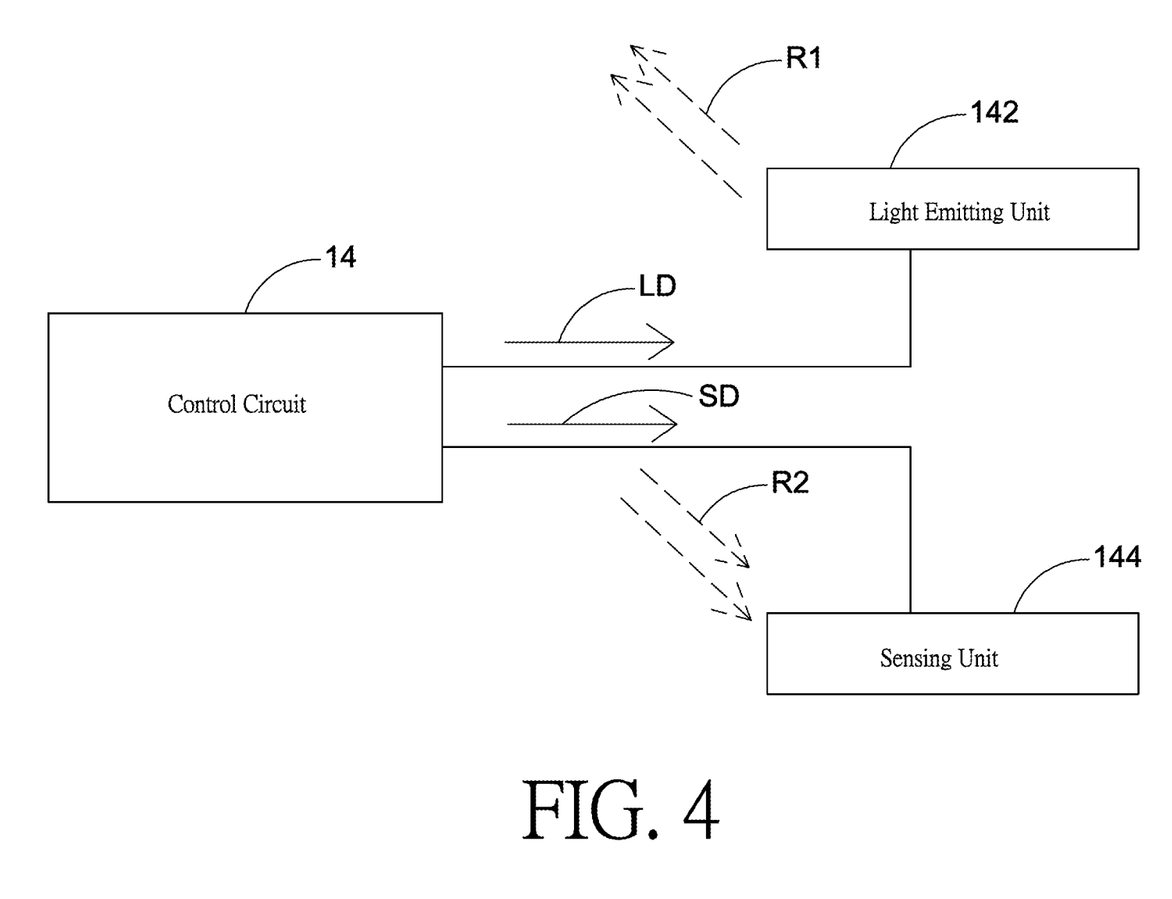
FIG. 4 shows a schematic diagram of the architecture of the circuit element in the electronic device according to an embodiment of the present application.

As described above, the circuit element 14 according to the present embodiment includes the light-emitting unit 142 so that the circuit element 14 may form various sensing devices such as proximity sensors, time-of-flight sensors, and dot projectors. In the following, a proximity sensor is first taken as an example for illustrating the operations of the circuit element 14 after receiving the dynamic refresh signal SS. As shown in FIG. 4, the circuit element 14 may include a light driving signal LD and a sense driving signal SD. The control circuit 146 receives the dynamic refresh signal SS and decodes the instruction C in the dynamic refresh signal SS to confirm the current refresh rate of the display unit 16 and further calculating the activation time of the light-emitting unit 142 according to the refresh rate. At the activation time of the light-emitting unit 142, the control circuit 146 will generate the light driving signal LD and transmit the light driving signal LD to the light-emitting unit 142 for driving the light-emitting unit 142 to emit a sensing ray R1. Meanwhile, according to the present embodiment, the control circuit 146 may further generate the sense driving signal SD and transmits the sense driving signal SD to the sensing unit 144 for driving the sensing unit 144 to sense a reflection ray R2 of the sensing ray R1. In addition, according to some embodiment of the present application, the sensing unit 144 senses light continuously. Thereby, the control circuit 146 may only use the light driving signal LD to drive the light-emitting unit 142. The light-emitting unit 142 may be a light-emitting diode or a laser diode. For sensing normal ranges, the sensing ray R1 is mainly invisible light such as infrared lgiht.

Moreover, as shown in FIG. 1, the circuit element 14 transmits a sensing signal DS generated by the sensing unit 144 to a processing unit 22 on the substrate 20. The processing unit 22 judges if the display unit 16 is proximate to an object or a human body according to the sensing signal DS and thus further judges whether to disable the touch and display functions of the display unit 16.

According to the above embodiment of the present application, the circuit element 14 and the display driving circuit 12 may coordinate. Then, no matter what the current refresh rate of the display unit 16 is, the circuit element 14 may calculate the activation time of the light-emitting unit 142 according to the refresh rate. Thereby, the interference of the sensing ray R1 of the light-emitting unit 142 on the display pixels for displaying colors normally may be prevented and hence ensuring no light spot or flicker on the display unit 16.

It is noteworthy that the activation time of the circuit element 14 described above may be deduced forwards from the start signal of the instruction C, backwards from the start signal of the instruction C, forwards from the end signal of the instruction C, or backwards from the end signal of the instruction C. Nonetheless, the present application is not limited to the above examples. In practice, once the circuit element 14 may acquire the current refresh rate of the display unit 16 according to the dynamic refresh signal SS, the current refresh rate may work with the display driving circuit 12 to control the activation of the light-emitting unit 142. The start or end pulse wave in the instruction C of the dynamic refresh signal SS may be generated corresponding to the timing signal of the display driving circuit 12, for example, the tearing-effect signal, the scan-line signal, or other synchronous signals. In addition, the instruction C may correspond to each frame displayed on the display unit 16 as driven by the display driving circuit 12. Alternatively, an instruction C may be formed for every several frames correspondingly.

According to another embodiment of the present application, the circuit element 14 may be a lens (image sensor) or a fingerprint sensor for different applications. Nonetheless, even if the circuit element 14 does not include the light-emitting unit 142, the dynamic refresh signal SS may still be used to judge the current refresh rate of the display unit 16 and hence enabling the circuit element 14 to correspond to or avoid the light emission time of the display pixels of the display unit 16.

Figure 5:
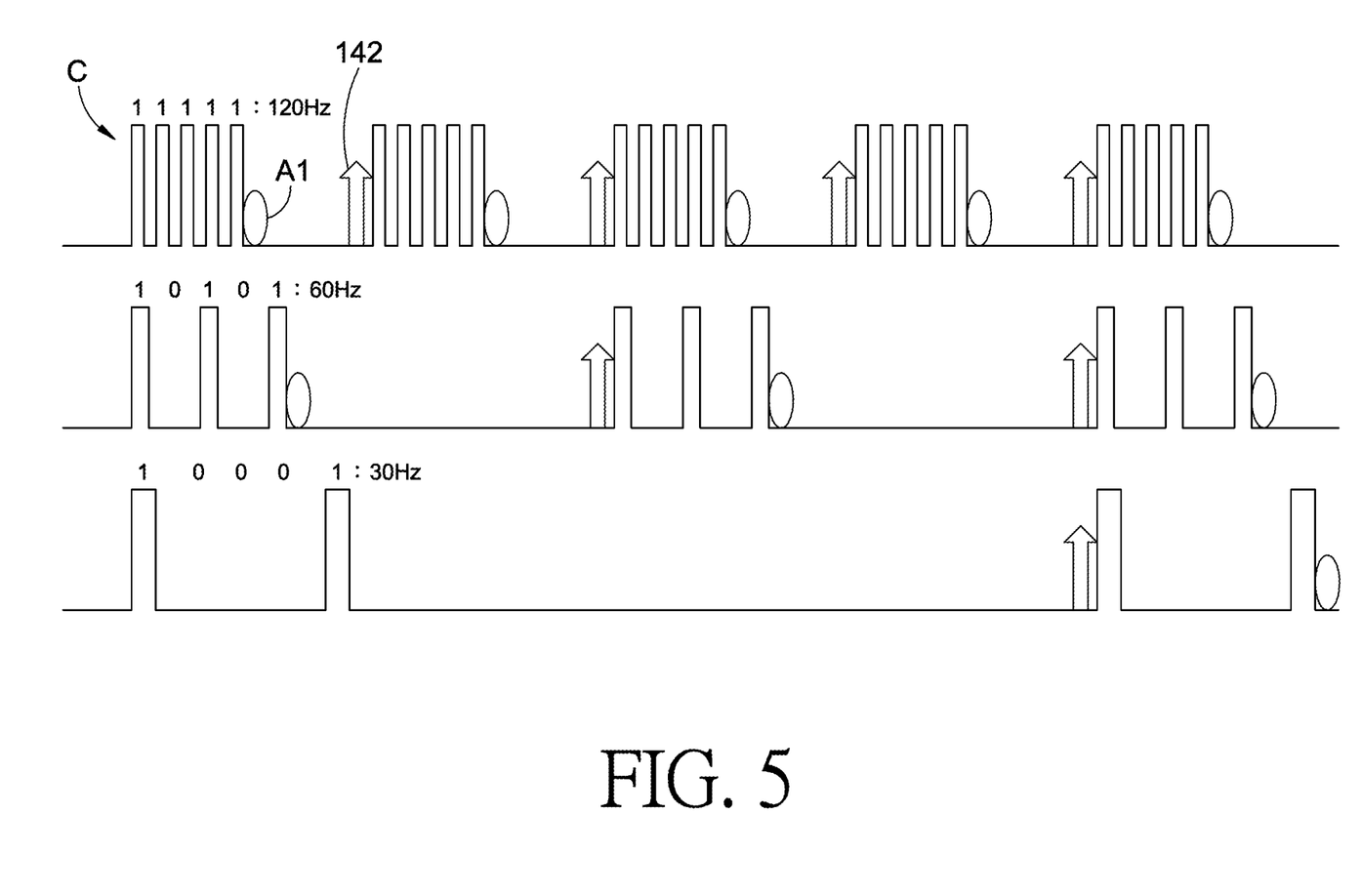
FIG. 5 shows a timing diagram of the dynamic refresh signal of the electronic device according to another embodiment of the present application.

Please refer to FIG. 5, which shows a timing diagram of the dynamic refresh signal of the electronic device according to another embodiment of the present application. As described in the previous embodiment, the activation time of the light-emitting unit 142 for different refresh rate of the display unit 16 is different. One of the main reasons is that the line time is different for different refresh time. Accordingly, according to the present embodiment, the dynamic fresh signal SS may contain the information of line time. For example, the width of each pulse wave in the instruction C may be corresponding to the line time of one or multiple scan lines. Normally, at low refresh rates, longer line times are allowed; at higher refresh rates, only shorter line times are allowed. Thereby, the figure shows that the widths of pulse waves of the dynamic pulse signal SS are set according to the information of line time. The line time may be accessed by the control circuit 146 of the circuit element 14 by using a timing circuit for subsequent operations.

Figure 6:
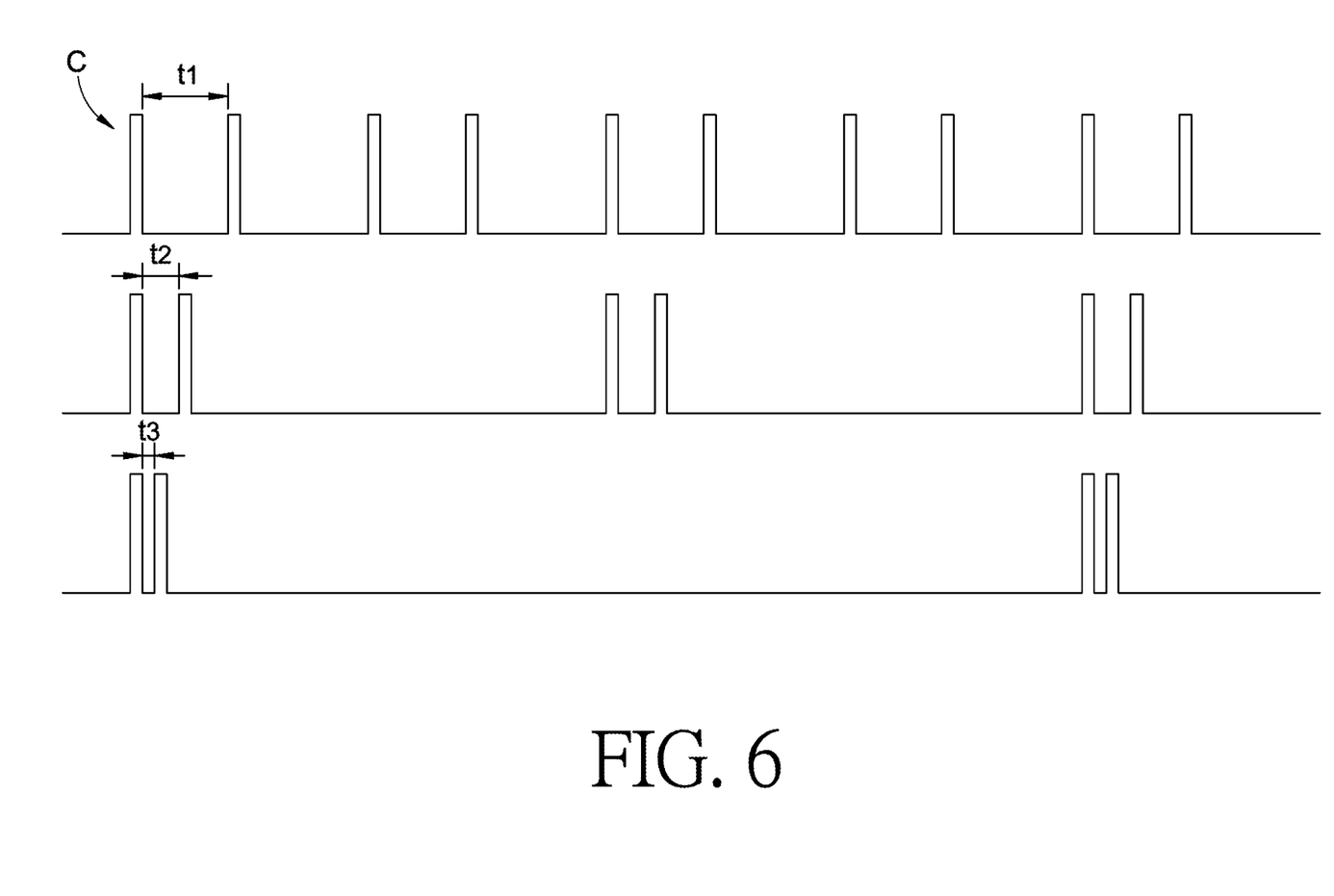
FIG. 6 shows a schematic diagram of the dynamic refresh signal of the electronic device according to the second embodiment of the present application.
Figure 7:
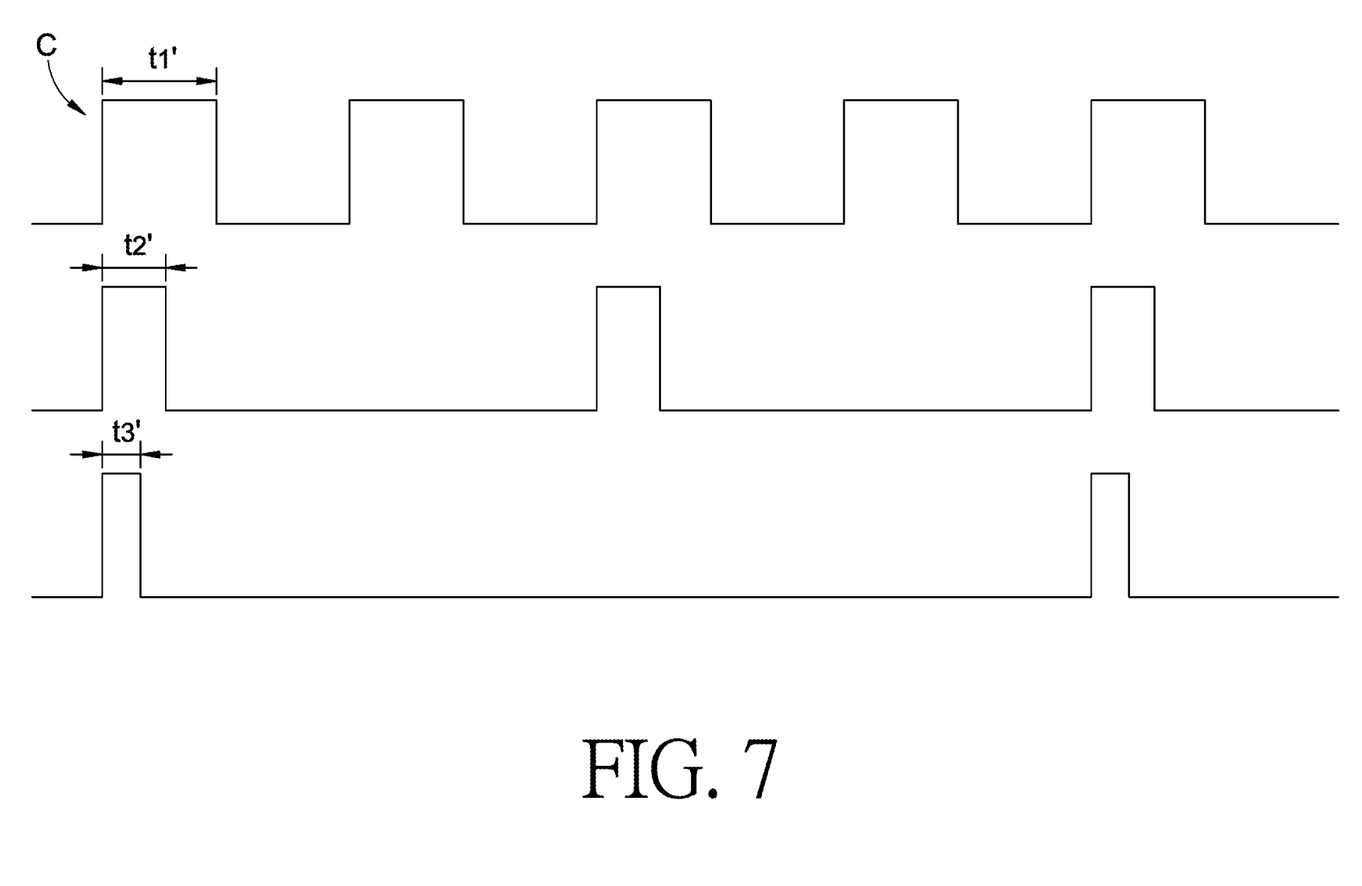
FIG. 7 shows a schematic diagram of the dynamic refresh signal of the electronic device according to the third embodiment of the present application.

On the other hand, please refer to FIG. 6 and FIG. 7, which show different embodiments of the dynamic refresh signal according to the present application. According to the embodiments of the present application, any method that is able to output the refresh rate of the display unit 16 to the control circuit 146 of the circuit element 14 may be adopted. For example, in FIG. 6, the time differences t1, t2, t3 between the start pulse wave and the end pulse wave of the instruction C may be encoded to represent the refresh rate of the display unit 16. Alternatively, as shown in FIG. 7, the instruction C contains pulse waves with different widths. Then the widths t1', t2', t3' of the pulse widths may be encoded to represent the refresh rate of the display unit 16. Alternatively, according to other embodiments, the duty ratio of pulse width modulation used to represent the refresh rate of the display unit 16 may be carried out, too.

To highlight the effects given by the various embodiments of the present application, in the following, the method for dynamically adjusting the refresh rate of a commercial product is taken as an example for illustration. In products that claim to have adaptive features, they generally make adaptive gradual adjustments to the refresh rate between an initial refresh rate and a target refresh rate to avoid flickering that could be noticeable to the human eye during adjusting the screen refresh rate. For example, if the refresh rate of the display unit 16 is to be lowered from 120 Hz to 10 Hz, the refresh rate might be adjusted gradually in the order of 120 Hz, 90 Hz, 60 Hz, 30 Hz, and 10 Hz. In this case, if the method according to the various embodiments of the present application is adopted, the display driving circuit 12 will output the dynamic refresh signal SS to the circuit element 14. Then the circuit element 14 may confirm the current refresh rate of the display unit 16 immediately for controlling the activation of the circuit element 14. In contrast, if the prior art is adopted, even if the electronic device 1 may notify the circuit element 14 that the refresh rate of the display unit 16 has been lowered to 10 Hz after adjusting the refresh rate adaptively using other methods, the circuit element 14 cannot get the current refresh rate of the display unit 16 in the whole adjusting process. Consequently, the circuit element 14 cannot be controlled to activate at the proper moment.

To sum up, the present application provides an electronic device. The circuit element under the display receives a dynamic refresh signal generated by a display driving circuit. The dynamic refresh signal includes the refresh rate information of the display panel for driving the circuit element to activate according the current refresh rate and thus avoiding the interference between display pixels and the circuit element under the display. In particular, when the circuit element under the display includes a light-emitting unit, the interference on displaying correct colors by the light emitted from the light-emitting unit may be further prevented. Thereby, no light spot or flicker will occur on the display panel.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. An electronic device, comprising:
   a display unit;
   a display driving circuit, coupled to said display unit; and
   a circuit element, disposed under a display region of said display unit, coupled to said display driving circuit, receiving a dynamic refresh signal generated by said display driving circuit, and said dynamic refresh signal including a refresh rate information of said display unit,
   wherein said circuit element comprises a control circuit for decoding said refresh rate information and controlling the activation of said circuit element according to said refresh rate information, wherein said circuit element comprises a light-emitting unit and controls the activation of said light-emitting unit according to said refresh rate information, wherein said circuit element activates according to said refresh rate information to avoid the interference on normal displaying of said display unit by the light emitted from said light-emitting unit.

2. The electronic device of claim 1, wherein said dynamic refresh signal comprises an instruction; said instruction comprises said refresh rate information and a start signal; and said circuit element deduces the activation time of said circuit element according to said refresh rate information and said start signal.

3. The electronic device of claim 1, wherein said dynamic refresh signal comprises an instruction; said instruction comprises said refresh rate information and an end signal; and said circuit element deduces the activation time of said circuit element according to said refresh rate information and said end signal.

4. The electronic device of claim 1, wherein said light-emitting unit is a light-emitting diode or a laser diode.

5. An electronic device, comprising:
   a display unit;
   a display driving circuit, coupled to said display unit; and
   a circuit element, disposed under a display region of said display unit, coupled to said display driving circuit, receiving a dynamic refresh signal generated by said display driving circuit, and said dynamic refresh signal including a refresh rate information of said display unit,
   wherein said circuit element comprises a control circuit for decoding said refresh rate information and controlling the activation of said circuit element according to said refresh rate information, wherein said circuit element comprises a light-emitting unit and controls the activation of said light-emitting unit according to said refresh rate information, wherein said circuit element further comprises a sensing unit; said control circuit generates a light driving signal to said light-emitting unit and a sense driving signal to said sensing unit according to said dynamic refresh rate; said light-emitting unit generates a light source according to said light driving signal; and said sensing unit receives a reflection ray corresponding to said light source according to said sense driving signal for generating a sensing signal.

6. An electronic device, comprising:
   a display unit;
   a display driving circuit, coupled to said display unit; and
   a circuit element, disposed under a display region of said display unit, coupled to said display driving circuit, receiving a dynamic refresh signal generated by said display driving circuit, and said dynamic refresh signal including a refresh rate information of said display unit,
   wherein said circuit element comprises a control circuit for decoding said refresh rate information and controlling the activation of said circuit element according to said refresh rate information, wherein said circuit element comprises a light-emitting unit and controls the activation of said light-emitting unit according to said refresh rate information, wherein said circuit element forms a proximity sensor, a time-of-flight sensor, or a dot projector.

7. The electronic device of claim 1, wherein said circuit element activates according to said refresh rate information to avoid the interference between said display unit and said circuit element.

* * * * *